Jan. 16, 1968     R. N. BENSON     3,363,347
VISUAL INDICATOR DEVICE
Filed Nov. 3, 1966     4 Sheets-Sheet 3
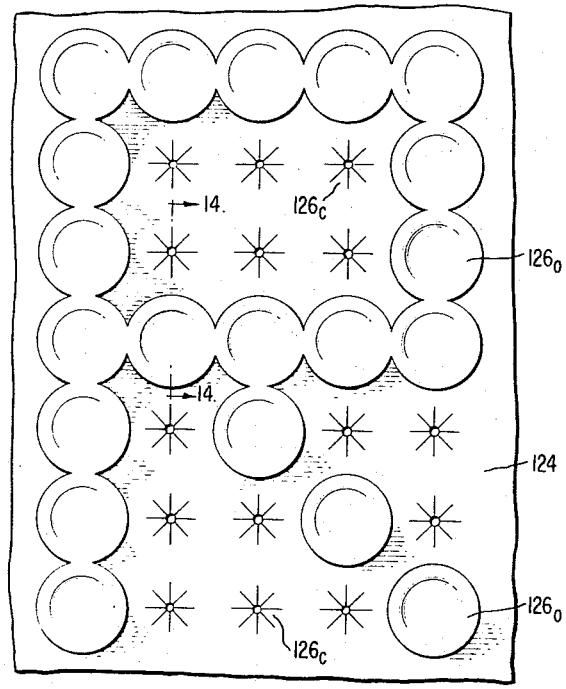
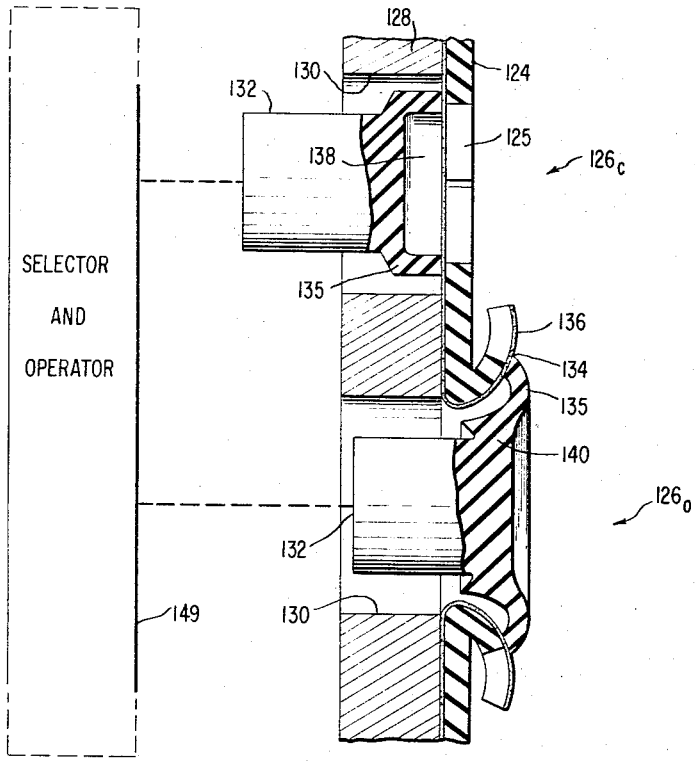
INVENTOR
ROBERT N. BENSON Jan. 16, 1968  R. N. BENSON  3,363,347
VISUAL INDICATOR DEVICE
Filed Nov. 9, 1966  4 Sheets-Sheet 4

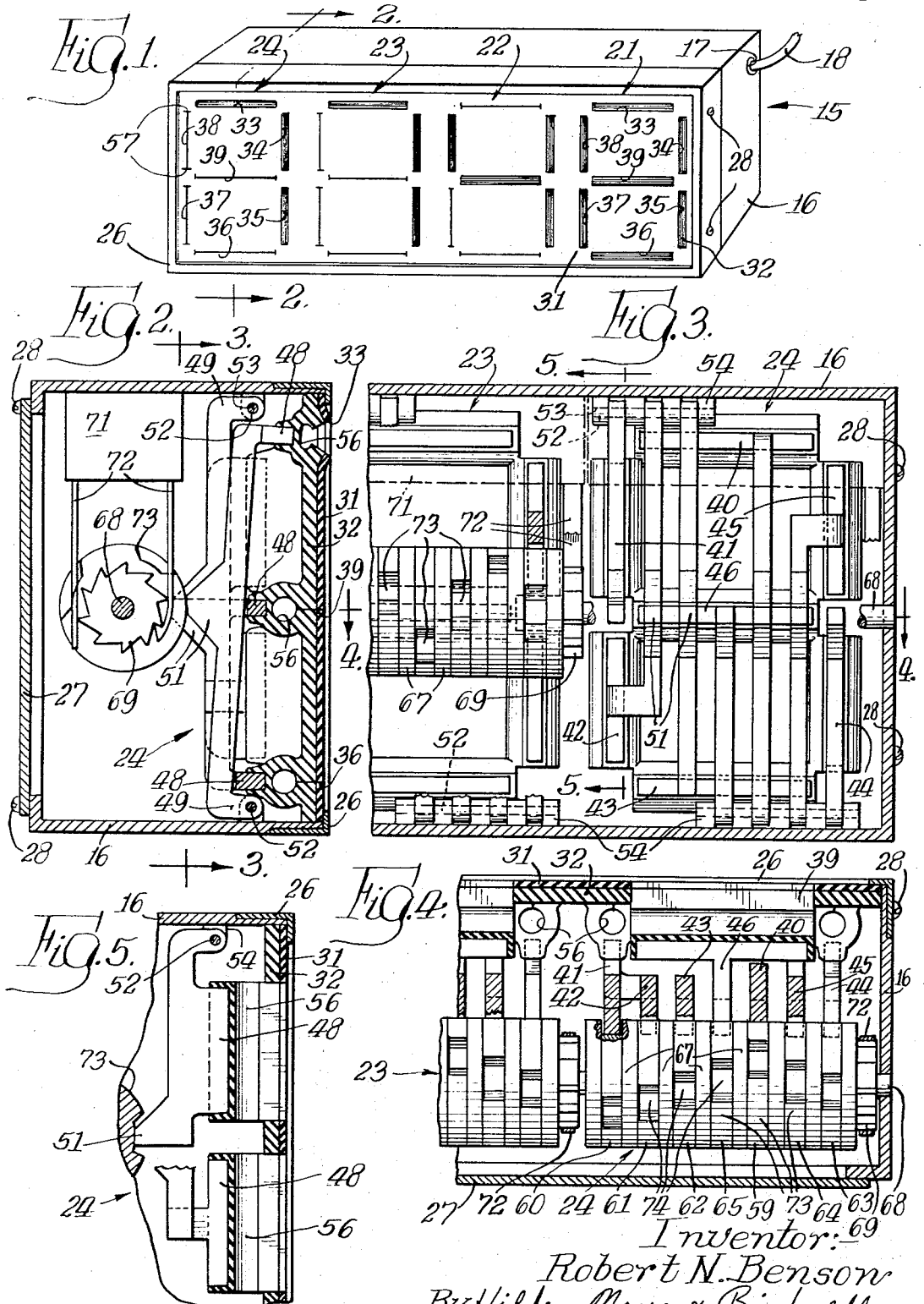

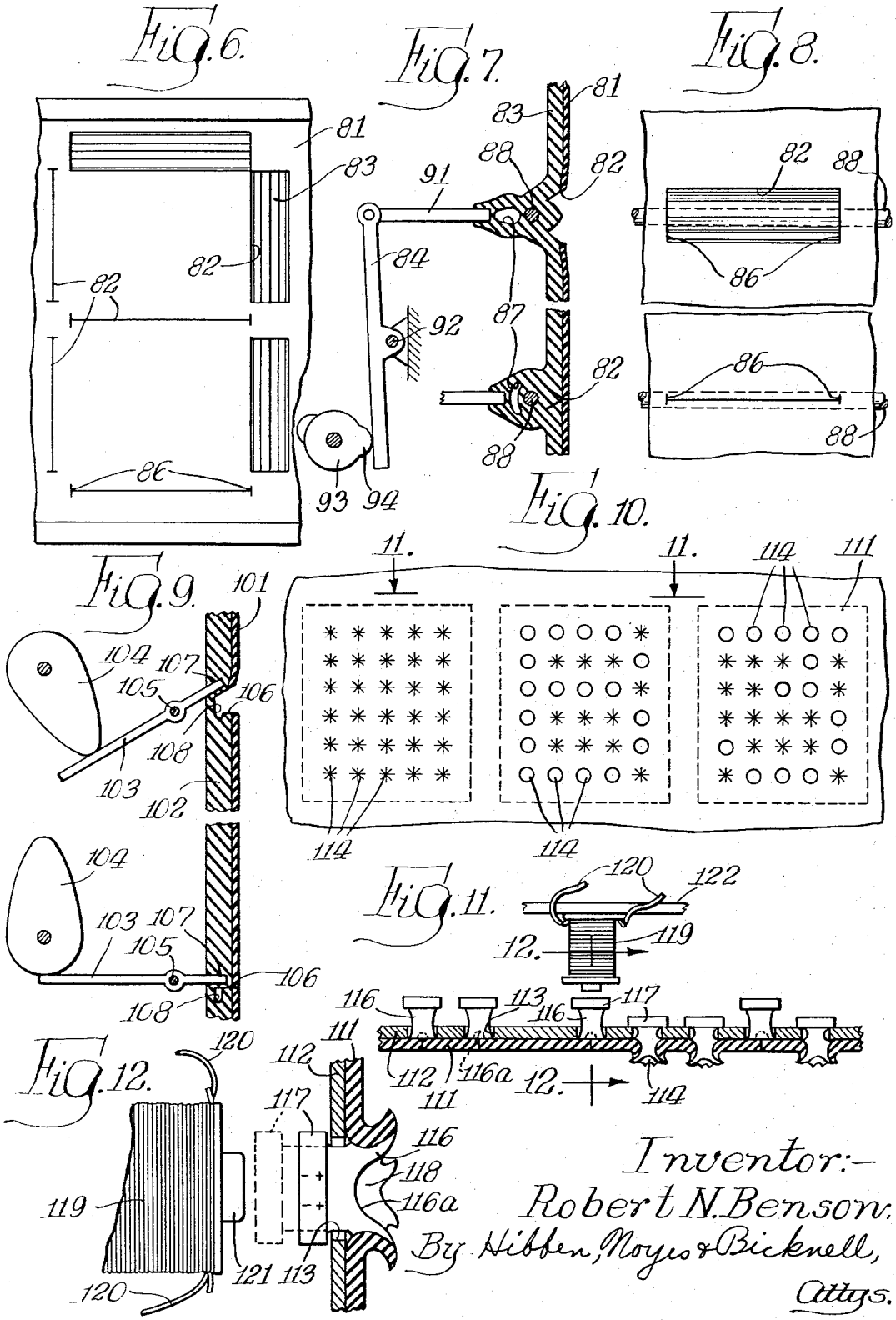

INVENTOR
ROBERT N. BENSON

United States Patent Office 3,363,347
Patented Jan. 16, 1968

3,363,347
VISUAL INDICATOR DEVICE
Robert N. Benson, 175 7th Ave., Wheeling, Ill. 60090
Continuation-in-part of application Ser. No. 546,095,
Apr. 28, 1966. This application Nov. 9, 1966, Ser.
No. 604,096
14 Claims. (Cl. 40—28)

This application is a continuation-in-part of my prior copending application Ser. No. 546,095, filed April 28, 1966, now abandoned.

This invention relates to improvements in indicators, and more particularly to a visual indicator or read-out device having flexible apertures.

Visual indicators are widely used for displaying information, usually in the form of numerals or alphabetic characters. Such indicators commonly use a changeable face display and there are a number of well known types in the art and in commercial use. These known types of changeable visual indicators include those visual indicators which utilize a projected light displayed image from a rear projector, those which use cold cathodes formed as characters or portions of characters and are superposed, those which utilize electroluminescence in a planar display, and those which utilize light conducting plates or rods for a single plane display of incandescent light. An additional common type of indicator is a cathode ray read-out tube, such as closed circuit TV tubes.

Each of the known types of visual indicators in the prior art has some disadvantages and drawbacks, especially when compared to a visual indicator having resilient elastic apertures as in this invention.

The disadvantages of rear light projection character indicators include the high capital cost per character, their necessity to use power to maintain the display and consequently the generation of heat, their poor readability in bright ambient light conditions, the amount of rear space that the projector must occupy, and the delicate nature of the projectors.

The cold cathode display tubes have some similar drawbacks, including high capital cost per character or digit, the necessity to use power to maintain the display and thereby generate heat, poor readability in bright ambient light conditions and poor readability due to the cross-hatch of the filaments. In addition, some versions of this tube require special high voltage power sources and tubes by their very nature are delicate.

Electroluminescent visual indicator displays also are relatively expensive per character in cost and also require the use of power to maintain the display and further also have the disadvantage of poor readability in bright ambient light conditions. In addition, electroluminescent character displays have a relatively short life which is linked to uneven aging of certain areas of the display due to uneven use.

The single plane incandescent display devices utilizing light conducting plates, rods or the like, also have the drawbacks of requiring power to maintain the display and thereby generate heat, having poor readability in bright light conditions, and commonly having a fairly narrow viewing angle. Such display devices are delicate, as well as relatively expensive.

Cathode ray tubes as utilized for visual display of alphanumeric characters as compared with the present invention, are relatively high in cost per bit of information, they have poor readability in high ambient light conditions, and the tube size limits the amounts of information and area of the display. They require power to maintain the display and do not lend themselves to modular construction. Moreover, the encoding and character generation systems are commonly quite complicated for such displays.

Another type of changeable visual indicator is a movable numeral carrier device, such as rotary counter wheels or belt numeral carriers. This type of display, however, has a much greater size in both display area and back area and hence in total volume than the display of this invention. In addition, better readability can be obtained with the invention due to the larger character per display area.

This invention utilizes the principle of a resilient, flexible, elastic aperture which due to the elasticity thereof is normally closed but which may be opened to present a contrast of the viewing area and may be used to display any type of information. The use of an elastic aperture display eliminates many of the disadvantages of the prior art devices above. The elastic aperture display of this invention needs no power to maintain the display and accomplishes this in a simple and non-complex manner. Additionally, the elastic apertures provide easier readability in a wide range of ambient light conditions due to more suitable contrast between the aperture background and the viewing area. Furthermore, elastic aperture displays are less expensive and easier to fabricate and provide a longer life per unit of investment than the prior art devices.

Other advantageous features of the invention will become apparent from the following description taken in conjunction with the accompanying drawings, in which:

FIG. 1 is a perspective view of an indicator embodying the invention;

FIG. 2 is an enlarged sectional view taken on the line 2—2 of FIG. 1;

FIG. 3 is a fragmentary sectional view taken on the line 3—3 of FIG. 2;

FIG. 4 is a fragmentary sectional view taken on the line 4—4 of FIG. 3;

FIG. 5 is a fragmentary sectional view taken on the line 5—5 of FIG. 3;

FIG. 6 is a partial front elevation view of an alternate form of this invention;

FIG. 7 is a partially schematic sectional view through a display as shown in FIG. 6;

FIG. 8 is a detail front elevation view of the device shown in FIG. 6;

FIG. 9 is a fragmentary sectional view, partially schematic, taken through a display showing another modification of this invention;

FIG. 10 is a partial front elevation view showing a still further and preferred embodiment of this invention;

FIG. 11 is a sectional view taken along line 11—11 of FIG. 10;

FIG. 12 is a sectional view taken along line 12—12 of FIG. 11;

FIG. 13 is a detail elevation view illustrating a still further and preferred embodiment of the actuator of this invention, having a configuration for self-latching;

FIG. 14 is an enlarged detail sectional view taken along line 14—14 of FIG. 13;

Figure 17:
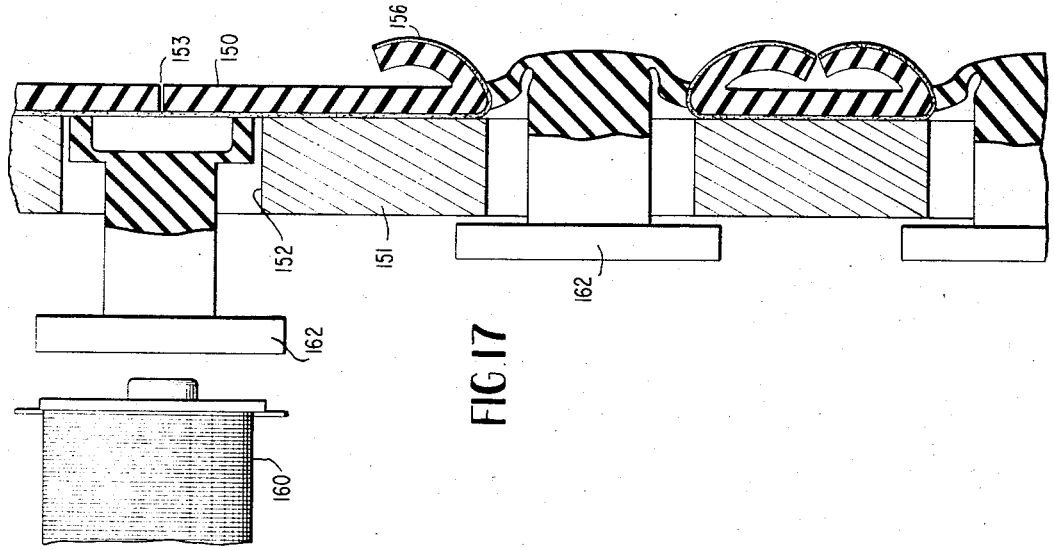
FIG. 17 is an enlarged sectional view taken through the display of FIGS. 15, 16.

In general, an indicator embodying the invention comprises a face layer having at least one flexible and preferably resilient elastic aperture formed in the layer and the portion of said layer which is adjacent said aperture is relatively flexible. Means are provided for expanding and thereby opening the resilient aperture to show a visual contrast between the open aperture and the rest of the face layer. There may be a number of apertures positioned in a display area of the face layer to create a monogram display. The points of the monogram display may physically touch in a display condition to make continuous lines.

The actuator means for expanding or opening the resilient aperture to provide the visual contrast may be a member positioned behind the aperture and constructed such that when the aperture is opened it will stay open without the use of continuously applied power until the member is positively moved to close the aperture.

In greater detail, FIGS. 1 to 5 illustrate an adaptation of the invention to a numerical read-out or display apparatus 15 for use in a computer, for example. The apparatus 15 comprises a generally rectangular case 16, having a hole 17 formed in one side thereof, through which are passed electrical conductors 18 for connecting the apparatus to a power supply (not shown). The case 16 is open at its front and back sides, and receives a plurality of indicator devices embodying the invention. In the present instance, four indicator devices 21 to 24 are provided, each being constructed to read-out or indicate any one of the numerals from 0 to 9 which may be viewed from the front of the apparatus. In FIG. 1, device 21 has been energized to indicate the numeral 8, device 22 indicates the numeral 4, device 23 indicates the numeral 7, and device 24 also indicates the numeral 7. Thus, the four devices together indicate the number 7748.

With reference to FIGS. 2 and 3, the four devices 21 to 24 are mounted within the case 16, a front frame or cover 26 being provided to hold the devices in place at the front of the apparatus and a back plate or cover 27 being provided at the back which permits access to the interior parts when it is removed. The two covers 26 and 27 may be attached to the case 16 by suitable means such as screws 28.

Each of the indicator devices 21 to 24 comprises a face layer 31 and, in this embodiment, a back layer or substrata member 32 (FIGS. 2 and 3). When a plurality of devices are arranged in side-by-side relation as shown in FIG. 1, adjacent layers 31 and 32 may be formed integrally. In the form shown in FIGS. 1 to 5, the layer 31 and the member 32 are made of flexible materials such as soft plastic or rubber, and have contrasting colors. For example, the layer 31 may be black and the member 32 may be white, or the layer 31 may be yellow and the member 32 may be black. The layer 31 and the member 32 are in sheet form, the two sheets being in face-to-face relation and attached by suitable means such as a relatively soft flexible adhesive.

A plurality of elastic resilient and flexible apertures 33 to 39 are formed in face layer 31 of each of the devices 21 to 24, the apertures 33 to 38 being in the form of slits and are inherently biased so that the slit is normally closed. The aperture slits may be arranged, as shown in FIG. 1, in the shape of a vertically elongated rectangle and the aperture 39 extending horizontally midway between the upper and lower sides of the rectangle. As shown in FIGS. 2, 4 and 5, the apertures extend through the face layer 31 and into the substrata member 32. It will be apparent that when the portion of the layer 31 adjacent the aperture 33 is flexed outwardly (FIG. 2) the portion of the substrata member 32 which is behind the opened aperture 33 will be visible through the opened aperture from the front side of the face layer 31. Since the color of the layer 31 contrasts with the color of the member 32, the portion of the member 32 overlying the slit 33 will stand out and form a straight horizontal line. In FIG. 1, the layer 31 of the device 21 has been flexed to open all of the apertures 33 to 39, thus forming the numeral 8; the apertures 34, 35, 38 and 39 of the device 22 have been opened to form the numeral 4; and for both of the devices 23 and 24, the apertures 33, 34 and 35 have been flexed to form the numeral 7. It will be apparent that by properly forming and flexing one or more apertures, any number, numeral or figure desired may be displayed. Although a seven bar monogram with the bars in the shape of an eight has been illustrated for use as a numeral display, the resilient aperture could be in any other suitable layout, for example, a 5 x 7 matrix of dots for an alpha-numeric display.

Mechanisms for selectively or simultaneously opening one or more of the slits 33 to 39 of the devices 21 to 24 are shown in FIGS. 2 to 5. For each device, the mechanism comprises a plurality of levers 40 to 46 which are respectively associated with the slits 33 to 39. Each of the levers 40 to 46 includes a pressure applying portion 48 (FIGS. 2, 4 and 5) at one end thereof, with a finger 49 at the opposite end thereof for making a pivotal connection with the case 16, and a rearwardly extending cam follower portion 51 between the ends thereof. The pressure portion 48 of each lever is relatively thin and elongated, and is approximately as long as the associated slit. The portion 48 is embedded in the substrata member 32, for example, by molding the member 32 on the portion 48. The opposite end of each lever is pivotally connected to the case 16 by a pin 52 which extends through holes 53 formed in bosses 54 formed on the top and bottom sides of the case 16.

It will be apparent from FIG. 2 that a selected one of the levers will be pivoted about its associated pin 52 so as to move its pressure applying portion 48 forwardly whenever a forwardly directed force is applied to its cam follower portion 51. Such pivotal movement of a lever causes its pressure applying portion 48 to push the adjacent portion of the member 32 forwardly a small distance, such displacement of the member 32 opening the slit in the layer 31 and thus exposing the member 32. To more effectively open a slit in this manner, each portion of the member 32 behind the slits is enlarged, and a void 56 is formed therein which extends parallel to the associated slit. The portions 48 of the levers are located just behind the voids 56, and the slit extends into the member 32 and to the void 56. Further, an additional transverse slit 57 is formed in the layer 31 at each end of each slit. Due to the holes 56 and the transverse slits 57, the main slits are opened relatively wide as shown in FIG. 2, for a given movement of the pressure applying portions 48 of the levers.

The levers 40 to 46 are adapted to be pivoted as described above by disk-shaped cams 59 to 65, respectively, which are mounted on a shaft 68, the latter shaft being rotatably received within holes formed in the end walls of the case 16. The cams are held in spaced relation on the shaft 68 by spacers 67, and are connected to be rotated, for example, as a unit by a ratchet wheel 69. A solenoid 71 which is secured to the case 16 and has two arms 72, 72' in engagement with the ratches wheel 69, may be provided to turn the cam when the solenoid is energized. Each of the cams has at least one cam surface 73 formed on its outer periphery, the cam surfaces 73 being adapted to engage and press the cam followers 51 of the levers forwardly. The arrangement of the cam surfaces 73 on the cams is such that, to form the numeral 7, for example, cam surfaces of the cams 59, 60 and 61 are located to simultaneously engage the cam followers 51 of the levers 40, 41 and 42, respectively, thereby pivoting the levers 40, 41 and 42 to open the slits 33, 34 and 35. The three cam surfaces in question are, of course, longitudinally aligned and the remaining cams have recesses 74 in alignment with these three cams. To form the numeral 8, the cams 59 to 65 are rotated as a unit to a position where they all have a cam surface 73 in engagement with the associated cam followers 51. It will be apparent that the other numerals may be displayed in sequence by properly locating the cam surfaces and recesses on the cams 59 to 65 and rotating the cams to the proper angular position by means of the solenoid actuated ratchet mechanism. Once the cams have been adjusted to cause a selected numeral to be displayed, electrical power to the solenoid 71 may be discontinued and the pivoted levers will remain in the actuated positions. Thus, the numeral will continue to be displayed without a continuous consumption of power. Further, as is evident from FIG. 1, the sizes of the numerals being displayed is very large, relative to the dimensions of the device 15.

While a cam and ratchet mechanism has been shown and described for actuating the levers for each device, it should be understood that other actuators could be used instead. For example, a plurality of relatively small latch-in relays could be used, each relay having its plunger positioned to engage one of the levers. Further the actuators do not have to open the elastic apertures to display numerals in sequence, but they could be displayed in selective or random order.

In the form of the invention shown in FIGS. 6 to 8, a resilient or elastic aperture in the form of a slit is opened by pivoting a lever away from the slit, rather than toward the slit as in the form shown in FIGS. 1 to 5. The form of FIGS. 6 to 8 comprises a resilient face layer 81 having a plurality of slits 82 formed therein, a resilient substrata member 83 secured to the back side of the layer 81, and a plurality of levers 84 for flexing the layer 81 to open the slits 82. A pair of transverse slits 86 are again formed at the ends of each slit 82 to increase the opening of the slits when actuated. As shown in FIG. 7, the portion of the member 83 adjacent each slit 82 is enlarged, and a void 87 extending parallel to the associated slit 82 is formed in each enlarged portion. Further, a relatively rigid rod 88 is embedded in each enlarged portion between the associated hole 87 and slit 82, to allow easier actuation.

The slit 82 extends through the layer 81 and into the member 83. From the layer 81, the slit branches in two directions, one branch being on each side of the associated rod 88. When a rearwardly directed pulling force is applied to an enlarged portion behind a slit 82, the portions of the member 83 at the sides and in front of the associated rod 88 are stretched rearwardly and sideways. The portion of the layer 81 at the edges of the slit 82 are similarly stretched because they are secured to the member 83, thus opening the slit as shown in FIG. 7. The two branches of the slit in the member 83 are provided in order to increase the opening of the slit.

To pull an enlarged portion of the member 83 rearwardly, a link 91 is pivotally connected to one end of the lever 84, the link 91 being embedded or molded into the enlarged portion behind the hole 87. The lever 84 is pivotally mounted as at 92 intermediate its ends, and a rotatable cam 93 having a cam surface 94 is positioned to engage the opposite end of the lever 84. When the cam 93 is rotated to bring the cam surface 94 into engagement with the lever 84, the latter is pivoted counterclockwise. The link 91 is thus removed to the left as seen in FIG. 7, resulting in a pulling force being exerted on the member 83 as described previously. A separate cam, lever and link should of course be provided for each slit.

In the form of the invention shown in FIG. 9, the portion of the face layer on one side of a slit is stretched laterally in order to open the slit. This form comprises a resilient face layer 101, a resilient substrata member 102, a lever 103 and a cam 104. A plurality of slits 106 are formed through the layer 101 and into the member 102. Each lever 103 includes a relatively thin, elongated pressure applying portion 107 which is embeded or molded into the member 102 adjacent the associated slit. The portion 107 extends parallel to and at one side of the slit, for substantially the length of the slit.

The other end of the lever 103 is engaged by a cam 104, and the lever 103 is pivotally mounted on a pin 105 intermediate its ends. When the cam 104 is rotated to bring its cam surface into engagement with the lever 103, the lever is pivoted counterclockwise, and the portion 107 of the lever is flexed away from the slit, thus opening the slit. To increase the size of the opening of the slit, additional transverse slits (not shown) similar to the slits 86 (FIG. 6) may be provided, and a cavity or hole 108 may be formed in the member 102 at the bottom of the slit.

In the form of the invention shown in FIGS. 10 to 12, there is shown a 5 x 6 matrix display with each point in the matrix being a resilient elastic aperture which is generally circular when opened and generally star shaped when in its normal closed state. A resilient face layer 111 is again provided which may be secured to a relatively firm base plate 112 of some ferrous material, for example, a thin sheet of steel or any other material to which a permanent magnet will be attracted. A series of holes 113 are formed through the base plate 112 in suitable matrices such as those shown in FIG. 10, where thirty holes 113 are formed through base plate 112 in 6 x 5 matrices on ¼ inch centers. Of course, any number of holes 113 could be used in any form of matrix that would be suitable to the various figures to be displayed. The portions of face layer 111 over the holes 113 have star-shaped slits 114 formed therein, the slits over each hole intersecting at the center of each hole 113 and extending to substantially the edge of the hole.

A member 116 is provided at each of the holes 113, the member 116 extending through the hole and being attached to the rearward side of the face layer 111. The color of the end of the member 116 contrasts with the color of the face layer 111, and the member 116 is preferably also made of a relatively resilient material. Each member 116 is generally cylindrical, the forward end of the cylinder being secured to the face layer 111 and the rearward end of the cylinder being secured to a permanent magnet 117 which is of a slightly larger width than the diameter of the hole 113. In the present instance, each magnet 117 is disk-shaped, and the faces of the disk are oppositely polarized.

To move each member 116 forwardly or rearwardly, an electromagnet including a coil 119 and a core 121 is provided, the location of the electro-magnet being adjustable so that the core 121 may be positioned substantially coaxial with and behind a magnet 117. The coil 119 may be energized by connecting its leads 120 to a suitable DC source, and when the direction of current flow is such that the end of the core 121 adjacent the magnet 117 has the same polarity as the adjacent face of the magnet 117, the magnet 117 will be repulsed forwardly. Such movement of the magnet 117 in turn pushes the member 116 forwardly through the star-shaped slit 114 (FIG. 12). When permanent magnet 117 makes contact with base plate 112, magnet coil 119 may be turned off and permanent magnet 117 will adhere due to its own magnetism to base plate 112. At a later time, magnet coil 119 may be reconnected to the DC power supply (not shown) such that current flows in the reverse direction and changes the polarity of the core 121. This will cause the core 121 to attract the permanent magnet 117 with sufficient force to overcome the attraction of the magnet 117 to the base plate 112. Permanent magnet 117 will thus be pulled back to its original position away from base plate 112, bringing with it the member 116 and causing slits 114 to close.

In this modification members 116 may be pushed through slits 114 where they will "latch" magnetically making members 116 clearly visible in contrast to face layer 111 until such time as it is desired to "unlatch" permanent magnet 117 pulling member 116 back and closing the slit 114. The forward end of the member 116 may be hollowed out as at 116a in order to increase the area of the member 116 which is visible when the member 116 is pushed forwardly. In addition to the force exerted by the core 121, the member 116 also tends to be pulled rearwardly by the inherent resilience of the member 116 and the layer 111.

It is now apparent that only one movable magnetic coil 119, mounted to be traversed both horizontally and vertically across the back of a matrix such as shown in FIG.

10, and operating repelling permanent magnet 117 till it "latches" the desired members 116 as they are indexed in turn, can cause any desired figure, numeral or letter of the alphabet to appear upon the face layer 111 of the device.

A large matrix containing many hundreds of holes 113, each containing a member 116 and capable of being latched as described in the foregoing, would embody sufficient resolution to display practically anything desired from alpha-numerical data to graphs or even pictures. The latching feature of the permanent magnet 117 allows the device to be completely disconnected from any source of power except while establishing or erasing a display. A mounting plate 122 provides a base for magnet coil 119. This base may be movable both horizontally and vertically parallel to the back of a device such as shown in FIG. 10 and may be controlled in such a manner as to allow operation or "latching" of each member 116 in the device.

FIGS. 13 and 14 show a preferred form of the invention wherein the resilient elastic aperture device has its apertures in the form of expandable points in a matrix and may be held in a display or non-display condition solely by the configuration of the components, including the face layer and operator member. That is, each point of the display has a bistable action in which it can either be in a display or non-display condition and once it is placed in this condition will stay there indefinitely until positively moved to the other of its two stable states. The display point will stay in one or the other of its stable positions without the application of external power or without the use of magnetic or other external latching means.

Referring more specifically to this preferred embodiment, a resilient elastic aperture indicator device includes a face layer 124 which provides a front viewable surface 125 having formed therein a plurality of flexible resilient elastic apertures 126 which are normally biased to a closed position so that closed slits in the shape of a star will be visible from a close distance and will blend with the background of surface 125 at normal viewing distances. Hence, when the flexible elastic apertures are closed, the display device is in its non-display state. However, upon opening one or more apertures a contrast may be viewed through the open aperture and the device is in its display condition or state. The elastic apertures 126 may thus either be in the open state 126o or closed 126c. Each flexible aperture forms a point on the 5 x 7 matrix shown in FIG. 13 in its display condition. As can be seen, these points touch or overlap in the display condition to display a continuous line.

Means are provided for selectively opening or closing the flexible resilient elastic aperture. This means includes a member 132 preferably of a soft resilient material and having essentially a cylindrical shape, one end being enlarged and with a suitable void 138 formed therein to give this portion 135 of member 132 essentially a tubular shape. Moreover, this portion 135 of member 132 is secured to bottom 136 of face layer 124 at point 134. The result being that when member 132 is moved forwardly through hole 130 in base plate 128 tubular portion 135 expands and latches over into its self-latching stable "operated" condition. The reason for this latching condition would be stated as thus: the enlarged tubular portion 135 of member 132 when pushed through the somewhat narrower opening in face layer 124 expands even more when emerging on the viewing side. The expanded condition of this portion resists being forced back through the restricted opening in face layer 124 sufficient to require positive pressure application to acquire restoration to the normal closed position or state. To have member 132 latch in the operated condition due to forces in the resilient materials only, the member 132 is moved forward to such an extent that the vector forces of tubular portion 135 and ear 141 hold the member in the operated condition. See lower half of FIG. 14. The bottom of the layer 125 has a thin layer 136 thereon of the same material, e.g., silicone rubber, as the members 132. The members 132 may be bonded to this thin layer using silicone rubber as an adhesive. When it cures, it is just as though the members 132, the thin layer 136 and the adhesive were formed in rubber, as the members 132. The members 132 may be under layer 136 behind layer 124 are of the same color and preferably have a visible contrast with the outer viewable surface 125 of layer 124. However, other arrangements can be utilized to provide a visible contrast between the opened aperture and surface 125. When the member 132 is returned to the retracted position by selector and operator 149, as shown in the top of FIG. 14, it will cause the aperture to close to assume the closed state as shown at 126c in the top of FIG. 14. The selector and operator 149 may be a plurality of electromagnets as shown in FIG. 17.

Figure 15:
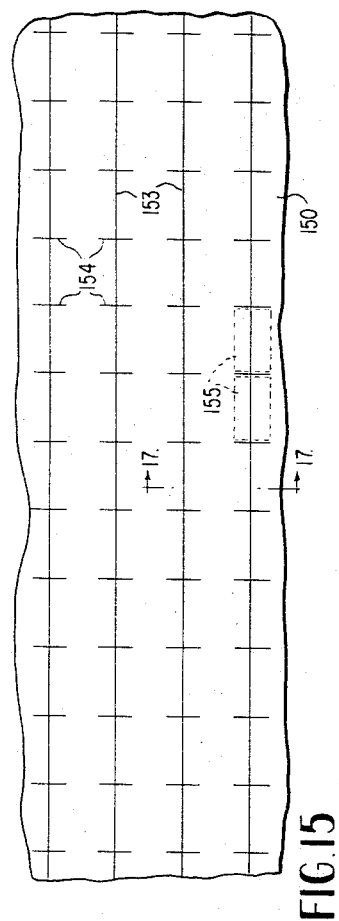
FIG. 15 is a front elevation view of yet another embodiment of the display in a non-operated condition.
Figure 16:
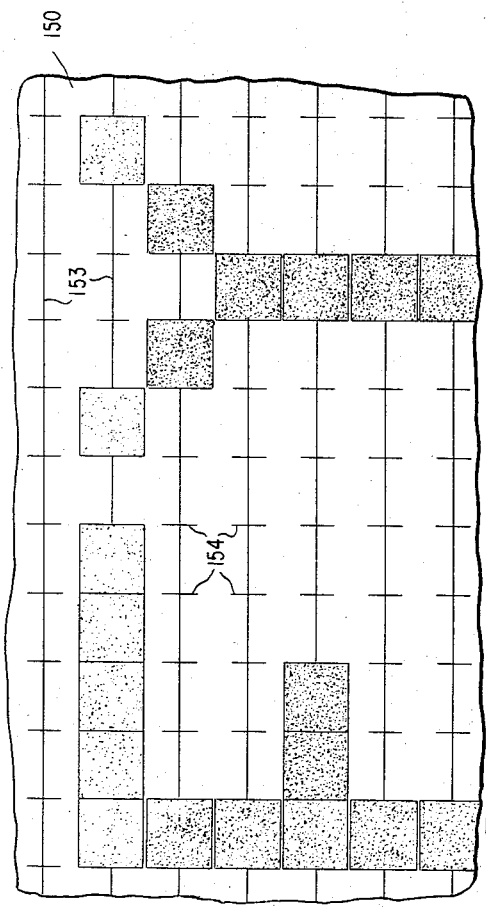
FIG. 16 is a front elevation view similar to FIG. 15 showing the display surface in operated condition.

FIGS. 15, 16 and 17 show a form of the invention which would produce greater resolution by presenting square "dots" rather than round "dots" to the viewer. This would form slightly different alpha-numeric figures and would greatly improve graphic displays because 100% of the viewing surface could be "operated," i.e., no blank spaces between the dots when all are operated.

Briefly, the embodiment of FIGS. 15, 16 and 17 includes an elastic face layer 150 bonded to a stiff base plate 151 which has a multiplicity of narrow slots 152 running horizontally. The face layer 150 has a slit 153 extending the length of these slots. Additional transverse slits 154 are spaced along the horizontal slits 153. Elastic members 155 having essentially an oblong shape when viewed from the front (two are shown through the face layer in FIG. 15) are bonded by means of adhesive layer 156 to the back surface of face layer 150. The surface 156 and members 155 have a color in contrast to the front surface of face layer 150. The members 155 are arranged side by side behind slits 153 but separated by transverse slits 154 so that each member 155 can be individually operated to form a square dot to the viewer, or when two or more adjacent dots are operated together they will show a continuous pattern or line on the horizontal or vertical axis (FIG. 16). However, on the diagonal they touch only at the corners.

The features of the FIGS. 15-17 embodiment would be desirable in a higher resolution display and the construction and operational details would be essentially the same as in the FIGS. 13 and 14 embodiment. In addition, FIG. 17 shows one means for operating and releasing these members 155. This means includes an electromagnet 160 for attracting or repelling magnetically attractable disc 162 on member 155. Such means could also be used for operating the bistable device of FIG. 14. In that case, unlike FIGS. 10 and 11 in which the back plate 112 is of ferrous metal to hold the members operated, the FIG. 14 embodiment would need only the coil and individual magnetic discs on the members to operate and release the displays. It should be understood again that this is only one way of operating members 155.

It is also obvious that many other forms of operating means or members may be provided, such as mechanical push rods, permanent magnets, plates, rollers, etc.

In some forms of the invention, the face layer may comprise a very thin layer such as a painting or coating of a pliable material, on a substrata member. The material of the face layer, especially in the area of the flexible apertures, is preferably a resilient elastic material which can stand repeated flexing such as silicone rubber. If the face layer is elastic enough only a small hole may be present at each display point instead of the illustrated elongated slits.

The essence of the invention is in providing a flexible and preferably resilient elastic aperture or series of apertures in a face layer together with means for opening and closing the apertures to provide a viewable contrast with the viewable surface of the face layer. The viewable contrast may be by color, as noted above, or by surface texture. Contrast by color includes phosphorescent and other light responsive visible contrast devices known in the art.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A changeable visual indicator device comprising:
    (a) a face layer including a viewable front surface,
    (b) at least one flexible aperture formed in the face layer, the aperture being closable to provide substantially no visible contrast from a normal viewing distance with the viewable front surface of the face layer,
    (c) means for selectively opening the flexible aperture, and
    (d) means for providing a visible contrast between the opening in the face layer caused by an opened flexible aperture and the viewable front surface of the face layer.
2. A changeable visual indicator device as in claim 1 wherein the means providing a visible contrast between the opening and the face layer caused by an open flexible aperture and the viewable front surface of the face layer is a colored or textured surface of the means for selectively opening the flexible aperture, which surface is visible through the opening in the face layer when the resilient aperture is opened.
3. A changeable visual indicator device as in claim 2 wherein the means for selectively opening the flexible aperture is a movable member positioned to contact the face layer in the area of the flexible aperture from a surface of the face layer opposite the viewing surface.
4. A changeable visual indicator device as in claim 3 wherein the movable member and face layer adjacent the flexible aperture assume stable states with the flexible aperture either open or closed.
5. A changeable visual indicator device as in claim 4 wherein the stable states are caused by the configuration of the flexible aperture and the movable member themselves.

6. A changeable visual indicator device as in claim 5 wherein the member has an enlarged and hollowed out portion on one end which is secured to the back surface of the face layer in the area of the flexible aperture.
7. A changeable visual indicator device as in claim 1 wherein the means for selectively opening the flexible aperture is an underlying layer and operating lever therefor.
8. A changeable visual indicator device as in claim 7 wherein the operating lever pushes on the underlying layer to open the flexible aperture.
9. A changeable visual indicator device as in claim 7 wherein the operating lever pulls on the underlying layer to close the flexible aperture.
10. A changeable visual indicator device as in claim 1 wherein the flexible aperture is an elongated slit in the face layer.
11. A changeable visual indicator device as in claim 1 wherein the flexible aperture is in the form of a point opening with slits radiating therefrom.
12. A changeable visual indicator device as in claim 1 wherein there are a plurality of flexible apertures arranged in a matrix to provide a monogram indicator device.
13. A changeable visual indicator as defined in claim 3 wherein there are a plurality of flexible apertures having a common slit extending in a straight line, and flexible apertures when open providing a continuous line display corresponding to the position of the slit.
14. A changeable visual indicator as defined in claim 13 wherein the flexible apertures are formed by short slits in the face layer substantially transverse to the common slit.

References Cited

UNITED STATES PATENTS

| | | | |
|---|---|---|---|
| 671,538 | 4/1901 | Conti | 40—28 |
| 1,393,665 | 10/1921 | Closson | 40—28 |
| 3,096,594 | 7/1963 | Skrobisch | 40—61 X |

EUGENE R. CAPOZIO, *Primary Examiner.*

W. J. CONTRERAS, *Assistant Examiner.*

UNITED STATES PATENT OFFICE
CERTIFICATE OF CORRECTION

Patent No. 3,363,347            January 16, 1968

Robert N. Benson

It is hereby certified that error appears in the above numbered patent requiring correction and that the said Letters Patent should read as corrected below.

Column 1, line 67, for "amounts" read -- amount --; column 4, line 51, for "ratches" read -- ratchet --; line 52, for "cam" read -- cams --; column 5, line 53, for "removed" read -- moved --; column 8, lines 5 and 6, strike out "in-rubber, as the members 132. The members 132 may be" and insert instead -- integrally. The inside surface 140 of member 132 and the --.

Signed and sealed this 29th day of April 1969.

(SEAL)
Attest:

Edward M. Fletcher, Jr.

Attesting Officer

EDWARD J. BRENNER

Commissioner of Patents